US011752678B2

(12) United States Patent
Konrad et al.

(10) Patent No.: US 11,752,678 B2
(45) Date of Patent: Sep. 12, 2023

(54) POLYESTER FILM WITH COATING

(71) Applicant: Mitsubishi Polyester Film GmbH, Wiesbaden (DE)

(72) Inventors: Matthias Konrad, Kriftel (DE); Deborah Altenhofen, Mainz (DE); Claudia Lohre, Wiesbaden (DE)

(73) Assignee: Mitsubishi Polyester Film GmbH, Wiesbaden (DE)

(*) Notice: Subject to any disclaimer, the term of this patent is extended or adjusted under 35 U.S.C. 154(b) by 539 days.

(21) Appl. No.: 16/546,432

(22) Filed: Aug. 21, 2019

(65) Prior Publication Data

US 2020/0061897 A1 Feb. 27, 2020

(30) Foreign Application Priority Data

Aug. 22, 2018 (DE) ..................... 10 2018 214 185.1

(51) Int. Cl.

| | |
|---|---|
| ***B29C 48/00*** | (2019.01) |
| ***C08G 63/183*** | (2006.01) |
| ***C08G 73/10*** | (2006.01) |
| ***C08L 67/02*** | (2006.01) |
| ***B29C 48/08*** | (2019.01) |
| ***C08J 7/04*** | (2020.01) |
| ***B29K 67/00*** | (2006.01) |

(52) U.S. Cl.

CPC .......... *B29C 48/0018* (2019.02); *B29C 48/08* (2019.02); *C08G 63/183* (2013.01); *C08G 73/10* (2013.01); *C08J 7/042* (2013.01); *C08L 67/02* (2013.01); *B29K 2067/00* (2013.01); *B29K 2995/0053* (2013.01); *C08L 2201/10* (2013.01); *C08L 2201/14* (2013.01); *C08L 2203/16* (2013.01)

(58) Field of Classification Search

CPC . B29C 48/0018; B29C 48/08; B29K 2067/00; B29K 2995/0053; B32B 2250/244; B32B 2255/10; B32B 2255/26; B32B 2307/412; B32B 2307/518; B32B 2307/7244; B32B 2307/732; B32B 2439/70; B32B 27/08; B32B 27/20; B32B 27/36; B32B 37/06; C08G 63/183; C08G 73/10; C08J 7/042; C08L 2201/10; C08L 2201/14; C08L 2203/16; C08L 67/02

See application file for complete search history.

(56) References Cited

U.S. PATENT DOCUMENTS 5,156,904 A * 10/1992 Rice ...................... B29C 55/026 428/219
10,639,873 B1 * 5/2020 Murga .................... B32B 27/20
2004/0028926 A1 * 2/2004 Peiffer .................... B32B 27/08 428/480
2004/0146727 A1 * 7/2004 Klein ...................... B32B 27/36 428/480
2004/0146750 A1 * 7/2004 Klein ...................... B32B 27/08 428/847.4
2005/0042441 A1 * 2/2005 Peiffer ...................... C08J 5/18 428/336
2006/0078718 A1 * 4/2006 Konrad .................... C08J 7/056 428/220
2008/0260917 A1 * 10/2008 Sankey .................. B65D 33/01 426/114
2011/0027581 A1 * 2/2011 Hirose .................... B32B 27/08 428/336
2011/0064855 A1 * 3/2011 Levie ..................... A21D 13/11 426/275
2015/0086734 A1 * 3/2015 Pietsch ...................... C08J 5/18 428/36.6

FOREIGN PATENT DOCUMENTS

| | | | |
|---|---|---|---|
| EP | 1457317 | A1 | 9/2004 |
| EP | 1457318 | A1 | 9/2004 |
| EP | 1647568 | B1 | 1/2009 |
| EP | 1777251 | B1 | 3/2012 |
| JP | 2013256573 | * | 12/2013 |
| JP | 5937319 | B2 | 6/2016 |
| JP | 6271118 | B2 | 1/2018 |
| WO | 1994/013476 | A1 | 6/1994 |
| WO | 2013/182444 | A1 | 12/2013 |

OTHER PUBLICATIONS

Carbodilite Waterborne Crosslinker—Tech Data by GSI (Year: 2021).*

European Search Report for corresponding European Application 19191183.3, dated Jan. 14, 2020 issued by EPO.

* cited by examiner

*Primary Examiner* — Frances Tischler
*Assistant Examiner* — Gennadiy Mesh
(74) *Attorney, Agent, or Firm* — ProPat, LLC; Vinisha Joshi

(57) ABSTRACT

A transparent, single- or multilayer, biaxially oriented polyester film with reduced oxygen transmission rates, having a barrier coating on at least one film surface, where the barrier coating is the drying product of an aqueous coating dispersion or aqueous coating solution, that includes at least one polyanion and at least one polyethyleneimine, where the polyanion has neutralized acid groups which are carboxylate, phosphate and/or sulfate groups, and the dry thickness d of the coating is in the range of 15 nm≤d<200 nm. The biaxially oriented, coated polyester film has transparency≥88% and oxygen permeation lower at least by a factor of two than that of the uncoated biaxially oriented film. A process for the production of the biaxially oriented, coated polyester film, and also its use as oxygen-barrier film.

13 Claims, No Drawings

POLYESTER FILM WITH COATING

CROSS-REFERENCE TO RELATED APPLICATIONS

This application claims priority to German Patent Application 10 2018 214 185.1 filed Aug. 22, 2018, which is hereby incorporated herein by reference in its entirety.

FIELD OF THE INVENTION

The invention relates to a coated biaxially oriented polyester film which has reduced oxygen transmission rate. The invention further relates to a process for the production of the film and to use of the latter.

BACKGROUND OF THE INVENTION

Polyester films have excellent optical and mechanical properties, therefore they are used in many different sectors. One application sector is food packaging. An important property here is protection of the food from oxygen.

Polyester films are known with various transparent barrier coatings. Films with PVDC (polyvinylidene chloride) coating are widely used. The oxygen transmission rate of these films is about 10 $cm^3/(m^2 \cdot d)$. Disadvantages are that the coating comprises chlorine and that the coating must be applied in a separate step (off-line).

Other conventional barrier layers are layers made of aluminium oxide ($AlO_x$) or silicon oxide ($SiO_x$). Here again, the layer is applied in a relatively expensive off-line process. The layers are moreover susceptible to mechanical damage.

WO 2013/182444 describes the use of an aqueous solution as barrier coating for film. The solution comprises a polyanion and polyethyleneimine. In the example, the transmission rate of a PP film of thickness 40 μm with 4 μm coating is reduced from 975 to 32 $cm^3/(m^2 \cdot d)$. Such layer thicknesses cannot be applied in-line by using aqueous solutions during the production of PET film, because drying capacity is insufficient at conventional production speeds. The quantity of coating would moreover be disadvantageous during regrinding of the film (return of production residues). Use of reground coating material impairs the optical properties of the film.

The films according to the prior art are disadvantageous because in all cases the barrier coating is applied to the films in an additional process step. The PVDC coating frequently employed comprises chlorine and is therefore not environmentally friendly. Oxide layers applied by vapour deposition methods are brittle and are therefore easily damaged during further processing to give packaging.

SUMMARY OF ADVANTAGEOUS EMBODIMENTS OF THE INVENTION

It was an object of the present invention to provide a coated, transparent polyester film which has reduced oxygen transmission rate, lower at least by a factor of two than that of the uncoated film, and which can be produced at low cost in a single process step. The intention is that there be no significant difference between the optical properties of the film and those of an uncoated polyester film.

The object is achieved via provision of a transparent single- or multilayer biaxially oriented, inline-coated polyester film, where the polyester film has a barrier coating on at least one film surface and is characterized in that (a) the thickness of the biaxially oriented polyester film (exclusive of coating) is 8 μm-100 μm, (b) the inline-applied barrier coating is the drying product of an aqueous dispersion or aqueous solution, where (c) the coating comprises at least one polyanion and at least one polyethyleneimine, where (d) the polyanion comprises neutralized acid groups which are carboxylate, phosphate and/or sulfate groups, and (e) the dry thickness d of the coating is in the range: 15 nm≤d≤200 nm, where the biaxially oriented, inline-coated polyester film has (f) transparency≥88% and (g) oxygen permeation lower at least by a factor of two than that of the uncoated biaxially oriented film.

DETAILED DESCRIPTION OF ADVANTAGEOUS EMBODIMENTS OF THE INVENTION

The polyester film according to the invention is comprised of polyester, additives and a coating.

The base layer preferably comprises at least 90% by weight of thermoplastic polyester. Polyesters suitable for this purpose are those made of ethylene glycol and terephthalic acid (=polyethylene terephthalate, PET), of ethylene glycol and naphthalene-2,6-dicarboxylic acid (=polyethylene 2,6-naphthalate, PEN), of 1,4-bishydroxymethylcyclohexane and terephthalic acid [=poly(cyclohexane-1,4-dimethylene terephthalate), PCDT], and also of ethylene glycol, naphthalene-2,6-dicarboxylic acid and biphenyl-4,4'-dicarboxylic acid (=polyethylene 2,6-naphthalate bibenzoate, PENBB). Particular preference is given to polyesters of which at least 90 mol %, preferably at least 95 mol %, consist of ethylene glycol units and terephthalic acid units or of ethylene glycol units and naphthalene-2,6-dicarboxylic acid units. The layer in a particularly preferred embodiment consists of polyethylene terephthalate homopolymer.

Suitable other aliphatic diols are by way of example diethylene glycol, triethylene glycol, aliphatic glycols of the general formula $HO—(CH_2)_n—OH$, where n is an integer from 3 to 6 (in particular propane-1,3-diol, butane-1,4-diol, pentane-1,5-diol and hexane-1,6-diol) or branched aliphatic glycols having up to 6 carbon atoms. Among the cycloaliphatic diols, mention may be made of cyclohexanediols (in particular cyclohexane-1,4-diol). Suitable other aromatic diols have by way of example the formula $HO—C_6H_4—X—C_6H_4—OH$, where X is $—CH_2—$, $—C(CH_3)_2—$, $—C(CF_3)_2—$, —O—, —S— or $—SO_2—$. Bisphenols of the formula $HO—C_6H_4—C_6H_4—OH$ also have good suitability.

Suitable other aromatic dicarboxylic acids are preferably benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, the (C3-C19) alkane diacids are particularly suitable, where the alkane moiety can be straight-chain or branched. Among heterocyclic dicarboxylic acids, particular mention may be made of furan-2,5-dicarboxylic acid.

The optionally present additional layer(s) (intermediate or outer layer(s)) of the film are likewise preferably comprised of a polyester as described above, where the composition is the same as or differs from the base layer described above.

The polyesters can by way of example be produced by the transesterification process. This starts from dicarboxylic esters and diols, which are reacted with conventional transesterification catalysts, such as zinc salts, calcium salts, lithium salts, magnesium salts and manganese salts. The intermediate products are then polycondensed in the presence of well known polycondensation catalysts, for example antimony trioxide or titanium salts. They can equally well be produced by the direct esterification process in the presence of polycondensation catalysts. These proceed directly from the dicarboxylic acids and the diols.

The film according to the invention comprises particles in order to achieve a certain roughness of the surface and in order to permit successful winding of the film.

Examples of particles that can be used are calcium carbonate, amorphous silica, talc, magnesium carbonate, barium carbonate, calcium sulfate, barium sulfate, lithium phosphate, calcium phosphate, magnesium phosphate, aluminium oxide, LiF, the calcium, barium, zinc and manganese salts of the dicarboxylic acids used, titanium dioxide, kaolin and particulate polymers, for example crosslinked polystyrene particles or crosslinked acrylate particles. Preferred particles used are amorphous silica. The particles are preferably used at a concentration below 0.5% by weight, based on the total weight of the film. It is preferable that the film according to the invention does not comprise other particles that influence the surface properties and rheological properties of the film.

If the film has a plurality of layers, the particles can be present in all layers, preferably in the outer layers.

The film can also additionally comprise, alongside the particles, conventional additives such as stabilizers. Examples of stabilizers that can be used are phosphorus compounds such as phosphoric acid or phosphoric esters.

The total thickness of the polyester film according to the invention can vary within certain limits. It is 8 to 100 μm, preferably 10 to 50 μm, particularly preferably 12 to 30 μm, where the proportion of the layer B (=base layer) in the multilayer variant is preferably 60 to 90% of the total thickness. The proportion of the base layer in the three-layer embodiment is preferably at least 60% of the total film thickness, particularly preferably at least 70% and very particularly preferably at least 75%.

In an embodiment, the film has three layers, and has an outer layer (A) on one of the sides of the layer (B) (=base layer), and has a further outer layer (C) on the other side of the layer (B). In this case, the two layers (A) and (C) form the outer layers (A) and (C). The barrier coating can be applied here to the outer layer (A) and/or to the outer layer (C). A three-layer structure can provide a film with low haze and good transparency in that the layer (B) comprises no further particles other than those introduced via addition of self-regrind. It is thus possible to increase the proportion of returned regrind; this leads to particularly cost-effective film production. The term self-regrind means film residues/waste arising during the film-production process (e.g. edge trims); these can either be returned directly during production or can first be collected and then added during production of the layer (B).

The intention here is to maximize the proportion of the returned recycled polyester material without impairing the film properties described according to the invention. The proportion of recycled polyester material in the base layer (B) in the film according to the invention can be 0-60% by weight, preferably 0-50% by weight and particularly preferably 0-40% by weight, based on the total weight of the film.

In an embodiment (I), the polyester film has three layers and has an ABC structure. The outer polyester layer (C layer) here opposite to the barrier coating (on the outer layer (A)) is a sealable layer. The sealable layer is amorphous and at least 90% by weight thereof consists of a thermoplastic polyester, this being a copolyester comprised of ethylene-glycol-derived monomer units and of terephthalic-acid-derived and isophthalic-acid-derived monomer units, where the proportion of the isophthalic-acid-derived units, based on the dicarboxylic-acid-derived units, is 10-30 mol %. The sealable layer permits direct use of the film (without application of a sealable lacquer) as sealable film (lid film) for packaging which comprises by way of example an APET tray or CPET tray.

The sealable layer can, like the other layers of the polyester film, comprise quantities below 0.2% by weight in the abovementioned particles.

Coating

The coating solution is an aqueous solution comprising a polyanion and at least one polyethyleneimine. The polyanion, also termed anionic polymer, is a polymer comprising acid groups which have been neutralized by one or more bases from the group of inorganic and monovalent organic bases. The average molar mass of this polymer before neutralization is at least 10 000 g/mol. The average molar mass of the polyethyleneimine is at least 25 000 g/mol.

Such coatings are described in WO 2013/182444.

Typical coating thicknesses described in WO 2013/182444, applied off-line, are 0.2 μm to 50 μm. Surprisingly, if the coating is applied inline a large reduction of the oxygen transmission rate of the biaxially oriented polyester film is achieved even when dry coating thickness is <200 nm. This is believed to be achieved by virtue of the transverse stretching of the coated film and the high temperatures at the end of the production process. Surprisingly, the films according to the invention with low dry layer thickness of the coating exhibit lower oxygen transmission rate than films coated in a separate step, i.e. off-line, with the same layer thickness.

The aqueous coating solution comprises 3-30% by weight of solids, the ratio by weight of the polyanion (before neutralization) to the polyethyleneimine preferably being 90:10 to 50:50, particularly preferably 80:20 to 65:45.

The thickness d of the dried coating is in the range 15 nm≤d<200 nm, preferably 20 nm≤d≤180 nm, particularly preferably 25 nm≤d≤150 nm. If the coating thickness d is <15 nm, the oxygen transmission rate reduction achieved for the film is no longer adequate. If the coating thickness d is ≥200 nm, there is an adverse effect on film properties when regrind is used. The cost-effectiveness of the film moreover decreases.

Use of the coating with the composition according to the invention in the thicknesses according to the invention achieves oxygen permeation of the coated biaxially oriented polyester film that is lower at least by a factor of two (50%) than that of the uncoated, biaxially oriented polyester film. The oxygen transmission rate of the coated, biaxially oriented polyester film is at most 50%, preferably at most 30% and particularly preferably at most 20%, of the oxygen transmission rate of a corresponding uncoated, biaxially oriented polyester film.

In an embodiment, the coating solution (or coating dispersion) comprises, in addition to the polyanion and the polyethyleneimine, 5-20% by weight of a crosslinking agent, based on the total solids content of the coating solution (or coating dispersion). This is preferably an oxazoline-modified polymer (oxazoline-based crosslinking agent) obtainable by way of example with tradename EPOCROS WS-500 and in particular EPOCROS WS-700 from Nippon Shokubai. Use of the quantities mentioned of the crosslinking agent improves the abrasion resistance of the coating, with no adverse effect on barrier action (increase of oxygen permeation) of the coating. Addition of more than 20% by weight of the crosslinking agent to the coating solution results in increased oxygen transmission rate.

In an embodiment, the film also bears, on the side opposite to the barrier layer, a coating made of a polymer dispersion, which serves as adhesion promoter for printing inks or for adhesives. Suitable polymers here are by way of example acrylates, for example the type described in WO 94/13476, polyurethanes, methacrylic acid or esters thereof.

In another embodiment, what is known as an antifog coating is applied in a thickness of 15-60 nm to the C layer (sealable layer) of embodiment (I). The antifog coating is the drying product of a hydrophilic coating composition which either comprises water, polyvinylpyrrolidone, an adhesion-promoting polymer which binds polyvinylpyrrolidone to polymer surfaces, and a surfactant, where the adhesion-promoting polymer is an acrylate, hydrophilic polyester, polyurethane, butadiene copolymer with acrylonitrile or methyl methacrylate, methacrylic acid or ester thereof, or comprises water, a sulfopolyester and a surfactant. The surfactant can be anionic (e.g. sodium dodecyl sulfate, the sodium and/or potassium salts of C10-C20-fatty acids), cationic (e.g. N-cetyl-N,N,N-trimethylamnmonium halides) halides and/or nonionic (e.g. C2-C25-alkylethoxylates having 2-50 repeat ethylene oxide units). The surfactant can also be a protective colloid such as polyvinyl alcohols or polyethylene glycol, and/or a random or block propylene oxide-ethylene oxide copolymer, where $M_W$ of the protective colloids should be between 200 and 10 000 g/mol. The surfactant is preferably anionic, selected from the group consisting of alkyl sulfates, alkylbenzene sulfates, alkyl ether sulfates and sulfosuccinic esters. If a sulfopolyester is used, this is particularly preferably a condensate made of the following monomers or of derivatives thereof capable of forming polyesters:

(A) up to 95 mol % of isophthalic acid, (B) 5 to 20 mol % of at least one sulfomonomer comprising an alkali metal sulfonate group on the aromatic moiety of an aromatic dicarboxylic acid, and (C) the stoichiometric quantity required to form 100 mol % of condensate of at least one copolymerizable aliphatic or cycloaliphatic glycol having from 2 to 11 carbon atoms.

Suitable antifog coatings are described in EP 1647568 B1 and EP 1777251 B1. The antifog coating permits production of packaging in which discernibility of the product remains good even when water condensate forms (within the packaging). If the thickness applied of the antifog coating is <15 nm, the antifog properties are not sufficient to provide adequate avoidance of water droplet formation. An applied thickness of >60 nm of the antifog coating leads firstly to reduced transparency/increased haze of the film and secondly to an adverse effect on the sealing properties of the sealable layer.

For use of the polyester film of the invention in packaging intended for contact with foods, it has proved to be advantageous that the coating dispersion of the barrier coating, and all of the other components optionally added (e.g. crosslinking agents) are listed in Regulation EU/10/2011 (Annex I, Table 1). The coating here should, after drying (and heat-setting) comply with the migration limits listed in EU/10/2011. If substances and/or solvents are present that are not listed in EU/10/2011 (Annex I, Table 1), or that have very low migration limits, it has proved advantageous to use those substances in a manner such that during heat-setting they either evaporate, decompose or undergo chemical reaction (e.g. crosslink or bond covalently to the polyester surface and/or to the polymer of the coating), so that migration (to the coated surface) is not measurable or is below the detection limit of the appropriate measurement method (for substances not listed in EU/10/2011 which are not CMR substances the migration limit value is 10 ppb).

For presentation of the packaged product, it is important that the biaxially oriented polyester film with barrier coating has excellent optical properties. The film according to the invention has these excellent optical properties. The transparency of the film here is at least above 88%, preferably above 90% and particularly preferably above 92%. The gloss of the film at 20° is moreover above 120, preferably above 130 and particularly preferably above 140. The haze of the film is moreover below 5%, preferably below 4.5% and particularly preferably below 4%. The optical properties can be achieved through the selection and use of the composition according to the invention for the film and for the coating. A particular point to be noted here is compliance with the coating thickness according to the invention.

Table 1 collates the inventive properties of the polyester film:

TABLE 1

| Film properties | Preferred range | Particularly preferred | Very particularly preferred | Unit | Measurement method |
|---|---|---|---|---|---|
| Dry thickness d of coating | 15 ≤ d < 200 | 20 ≤ d ≤ 180 | 25 ≤ d ≤ 150 | nm | Ellipsometer |
| Transparency | >88 | >90 | >92 | % | ASTM D1003-61 |
| Haze | <5 | <4.5 | <4 | % | ASTM D1003-61 |
| Gloss (20°) | >120 | >130 | >140 | | DIN 67530 |
| Oxygen permeation (23° C., 50% rH) in comparison with uncoated film of same thickness | ≤50% | ≤30% | ≤20% | $cm^3/m^2$ d bar | DIN 53380, Part 3 |

The properties of the films according to the invention make them suitable for use as transparent films, in particular as oxygen-barrier films, for food packaging. The films described here can be used either directly (alone), e.g. in single-component packaging (tray and lid film consisting of polyester), or by way of example in laminates with polyolefin films.

Production Process

The production process for polyester films is described by way of example in "Handbook of Thermoplastic Polyesters", Ed. S. Fakirov, Wiley-VCH, 2002 or in the chapter entitled "Polyesters, Films" in "Encyclopedia of Polymer Science and Engineering, Vol. 12, John Wiley & Sons, 1988". The preferred process for the production of the film comprises the following steps. The raw materials are melted in one extruder per layer and extruded through a single- or multilayer flat-film die onto a chilled take-off roll. This film is then reheated and oriented in longitudinal direction (MD or machine direction) and transverse direction (TD), or in transverse and longitudinal direction. The film temperatures in the stretching procedure are generally 10 to 60° C. above the glass transition temperature Tg of the polyester used, and usually the longitudinal stretching ratio is 2.5 to 5.0, in particular 3.0 to 4.5, the transverse stretching ratio being 3.0 to 5.0, in particular 3.5 to 4.5. The longitudinal stretching can also be carried out simultaneously with the transverse stretching (simultaneous stretching), or in any conceivable sequence. The film is then heat-set at oven temperatures of 180 to 240° C., in particular of 210 to 230° C. The film is then cooled and wound up.

The biaxially oriented polyester film according to the invention is coated in-line; the coating is therefore applied during the film-production process before longitudinal and/or transverse stretching. In order to achieve good wetting of the polyester film by the aqueous coating composition, the surface is preferably first corona-treated. The coating can then be applied by a familiar suitable process, for example using a slot coater or a spray method. It is particularly preferable to apply the coating by means of the reverse gravure-roll coating method, which can apply the coating extremely homogeneously with application weights (wet) between 1.0 and 3.0 g/m$^2$. Application by the Meyer-rod method is likewise preferred; this permits achievement of larger coating thicknesses. The thickness of the coating on the finished film is preferably 15 to <200 nm, preferably 20 to 180, particularly preferably 25 to 150 nm.

The film according to the invention features low oxygen transmission rate, which is at most 50% of that of the uncoated film. The coating has no adverse effect on the optical properties of the film. Transparency and gloss are comparable with those of the uncoated film.

Methods

The following measurement methods were employed for the characterization of the raw materials and of the films for the purposes of the present invention:

SV Value (Standard Viscosity)

Standard viscosity in dilute solution SV was measured by a method based on DIN 53 728 Part 3 in an Ubbelohde viscometer at (25±0.05)° C. Dichloroacetic acid (DCA) was used as solvent. The concentration of the dissolved polymer was 1 g of polymer/100 mL of pure solvent. Dissolution of the polymer took 1 hour at 60° C. If the samples had not dissolved completely after this time, up to two further dissolution attempts were carried out at 80° C. in each case for 40 min, and the solutions were then centrifuged for 1 hour at a rotation rate of 4100 min$^{-1}$.

The dimensionless SV value is determined as follows from the relative viscocity ($\eta_{rel}$–n/$\eta_s$):

$$SV=(\eta_{rel}-1)\times 1000$$

The proportion of particles in the film or polymer raw material was determined by means of ashing and corrected by increasing input weight accordingly, i.e.:

$$\text{input weight} = \frac{(\text{input weight corresponding to 100\% of polymer})}{[(100 - \text{particle content in \% by weight})\cdot 0.01]}$$

Gloss

Gloss is determined in accordance with DIN 67530. The reflectance value is measured as optical variable representing the surface of a film. Using a method based on the standards ASTM D523-78 and ISO 2813, the angle of incidence is set to 20° C. A light beam impacts the flat test surface at the set angle of incidence and is reflected or scattered thereby. Light impacting the photoelectronic detector is indicated in the form of a proportional electrical variable. The value measured is dimensionless and must be stated together with the angle of incidence.

Oxygen Transmission Rate (OTR)

The oxygen barrier was measured with an OXTRAN® 100 from Mocon Modern Controls (USA) in accordance with DIN 53 380, Part 3 (23° C., 50% relative humidity on both sides of the film). The OTR was measured here in each case on a film of thickness 12 μm.

Haze, Transparency

The test serves to determine the haze and transparency of plastics films for which optical clarity and, respectively, haze is significant for functional values. The measurement is made in accordance with ASTM D1003-61 in a haze-gard XL-21 1 haze meter from BYK Gardner.

Seal Seam Strength in Relation to Itself (=FIN Sealing)

Seal seam strength was determined by mutually superposing two film strips of width 15 mm and sealing these at 130° C. with a sealing time of 0.5 s and a sealing pressure of 2 bar (device: Brugger NDS, single-side-heated sealing jaw). Seal seam strength is determined by the T-peel method=2·90°.

The invention is explained in more detail with reference to the Examples below.

Inventive Example 1

Outer Layers (A):

92% by weight of polyethylene terephthalate made of ethylene glycol and terephthalic acid with SV value 825 and DEG content 0.9% by weight (diethylene glycol content as monomer). Produced by PTA process. Catalyst potassium titanyl oxalate with 18 ppm of titanium. Transesterification catalyst zinc acetate.

8% by weight of polyethylene terephthalate made of ethylene glycol and dimethyl terephthalate with SV value 820 and DEG content 0.9% by weight (diethylene glycol content as monomer) and 1.5% by weight of silicon dioxide particles with d50 2.5 μm Sylobloc 46. Produced by PTA process. Catalyst potassium titanyl oxalate with 18 ppm of titanium. Transesterification catalyst zinc acetate.

Base Layer (B):

100% by weight of polyethylene terephthalate made of ethylene glycol and terephthalic acid with SV value 825 and DEG content 0.9% by weight (diethylene glycol content as monomer). Produced by PTA process. Catalyst potassium titanyl oxalate with 18 ppm of titanium. Transesterification catalyst zinc acetate.

Coating on an Outer Layer (A):

The coating was produced from an aqueous solution of polyethyleneimine (Mw=750 000 g/mol, pH=11, charge density 17 meq/g) and a solution of an acrylic acid/maleic acid copolymer (3:1, Mw=80 000 g/mol) neutralized with ammonia. The polyethyleneimine content in the coating was 7% by weight; the copolymer content was 5% by weight.

The abovementioned raw materials were melted in an extruder for each layer and extruded through a three-layer flat-film die (ABA layer sequence) onto a chilled take-off roll. The resultant amorphous prefilm was then first stretched longitudinally. The longitudinally stretched film was corona-treated in corona-discharge equipment and then coated by reverse-gravure coating with the solution described above. A gravure roll with volume 6.6 $cm^3/m^2$ was used. Wet application weight was 2.7 $g/m^2$. The film was then dried at a temperature of 100° C. and then transversely stretched, set and rolled up (final film thickness 12.0 μm, outer layer (A) in each case 1.1 μm). The conditions in the individual steps of the process were:

Longitudinal stretching: Temperature: 80-115° C.
 Longitudinal stretching ratio: 4.0
Transverse stretching: Temperature: 80-135° C.
 Transverse stretching ratio: 4.1
Setting: 2 s at 225° C.
The thickness of the dry coating was 80 nm.
The properties of the resultant film are shown in Table 2.

Inventive Example 2

The composition of the outer layers was changed from Inventive Example 1.

Outer Layer (A):

90% by weight of polyethylene terephthalate made of ethylene glycol and terephthalic acid with SV value 825 and DEG content 0.9% by weight (diethylene glycol content as monomer). Produced by PTA process. Catalyst potassium titanyl oxalate with 18 ppm of titanium. Transesterification catalyst zinc acetate.

10% by weight of polyethylene terephthalate made of ethylene glycol and dimethyl terephthalate with SV value 820 and DEG content 0.9% by weight (diethylene glycol content as monomer) and 1.5% by weight of silicon dioxide particles with d50 2.5 μm Sylobloc 46. Produced by PTA process. Catalyst potassium titanyl oxalate with 18 ppm of titanium. Transesterification catalyst zinc acetate.

Outer Layer (C):

97% by weight of polyester made of ethylene glycol and terephthalic and isophthalic acid with SV value 825, isophthalic acid content 22% by weight and DEG content 0.9% by weight (diethylene glycol content as monomer). Produced by PTA process. Catalyst potassium titanyl oxalate with 18 ppm of titanium. Transesterification catalyst zinc acetate.

3% by weight of polyethylene terephthalate made of ethylene glycol and dimethyl terephthalate with SV value 820 and DEG content 0.9% by weight (diethylene glycol content as monomer) and 1.5% by weight of silicon dioxide particles with d50 2.5 μm Sylobloc 46. Produced by PTA process. Catalyst potassium titanyl oxalate with 18 ppm of titanium. Transesterification catalyst zinc acetate.

The coating used on the outer layer (A) was the same as in Inventive Example 1. The film is heat-sealable by virtue of the composition of the outer layer (C). Its seal seam strength is 2.5 N/15 mm at a sealing temperature of 130° C. (0.5 s, 4 bar).

Inventive Example 3

Unlike in Inventive Example 1, the second outer layer (A') was also coated.

Coating on outer layer (A): as in Inventive Example 1

Coating on Outer Layer (A'):

The aqueous coating was comprised of a copolymer of 60% by weight of methyl methacrylate, 35% by weight of ethyl acrylate and 5% by weight of N-methylolacrylamide and a surfactant. Solids content was 5% by weight. The thickness of the dry coating was 30 nm.

The properties of the resultant film are shown in Table 2. The film exhibited good print adhesion on the outer layer (A').

Comparative Example 1

The composition of the coating was changed from that in Inventive Example 1. The coating comprised 10% by weight of an acrylic acid/maleic acid copolymer (3:1, Mw=80 000 g/mol).

Dry layer thickness was again 80 nm.

The oxygen transmission rate of the film was similar to that of an uncoated film.

Comparative Example 2

The properties of the uncoated film were measured for comparison with Inventive Example 1.

Comparative Example 3

The film of Comparative Example 2 was coated with the coating from Inventive Example 1 in a separate step (off-line). Drying temperature was 130° C. The coating thickness of the dried film was the same as in Inventive Example 1. Dry layer thickness was 80 nm.

The film has a higher oxygen transmission rate than the film of Inventive Example 1.

TABLE 2

| Film properties | Inv. Ex. 1 | Inv. Ex. 2 | Inv. Ex. 3 | CE 1 | CE 2 | CE 3 | Unit |
|---|---|---|---|---|---|---|---|
| Thickness of film | 12 | 12 | 12 | 12 | 12 | 12 | ° μm |
| Thickness of coating (A) | 80 | 80 | 80 | 80 | 0 | 80 | nm |
| Thickness of coating (A') | — | — | 30 | 0 | 0 | 0 | nn |
| Transparency | 92.7 | 93.1 | 92.8 | 92.3 | 91.0 | 92.1 | % |
| Gloss (20°) of side (A) | 137 | 135 | 138 | 141 | 185 | 139 | |

TABLE 2-continued

| Film properties | Inv. Ex. 1 | Inv. Ex. 2 | Inv. Ex. 3 | CE 1 | CE 2 | CE 3 | Unit |
|---|---|---|---|---|---|---|---|
| Oxygen transmission rate of film (23° C., 50% rH) | 13 | 14 | 13 | 108 | 110 | 58 | $cm^3/m^2 \cdot d \cdot bar$ |
| Oxygen transmission rate in comparison with uncoated film | 11.8 | 12.7 | 11.8 | 98.2 | 100 | 53 | % |

That which is claimed:

1. A transparent, single- or multilayer, biaxially oriented polyester film comprising a barrier coating on at least one film surface;

Wherein the thickness of the biaxially oriented polyester film (exclusive of coating) is 8 μm-100 μm, and Wherein the barrier coating is the drying product of an aqueous coating dispersion or aqueous coating solution which comprises at least one polyanion and at least one polyethyleneimine, where the polyanion comprises neutralized acid groups which are carboxylate, phosphate and/or sulfate groups, and the dry thickness d of the coating is in the range: 15 nm≤d<200 nm, and wherein the biaxially oriented, coated polyester film has transparency≥88% and oxygen permeation lower at least by a factor of two than that of the uncoated biaxially oriented film, and wherein the polyester in said polyester film is selected from the group consisting of polyethylene terephthalate, polyethylene 2,6-naphthalate, poly(cyclohexane-1,4-dimethylene terephthalate), polyethylene 2,6-naphthalate bibenzoate, and a copolyester of ethylene-glycol-derived monomer units and of terephthalic-acid-derived and isophthalic-acid-derived monomer units.

2. The polyester film according to claim 1, comprising three layers, a base layer (B) and respectively an outer layer (A) and an outer layer (C), where the outer layer (A) has been applied on one of the sides of the base layer (B) and the outer layer (C) has been applied on the other side of the base layer (B).

3. The polyester film according to claim 2, wherein the film having three layers has an ABC structure, where the outer layer (C layer) opposite to the barrier coating (on the outer layer (A)) is a sealable layer.

4. The polyester film according to claim 3, where the sealable layer is amorphous and at least 90% by weight thereof consists of said copolyester of ethylene-glycol-derived monomer units and of terephthalic-acid-derived and isophthalic-acid-derived monomer units, where the proportion of the isophthalic-acid-derived units, based on the dicarboxylic-acid-derived units, is 10-30 mol %.

5. The polyester film according to claim 1, wherein the average molar mass of the polyanion before neutralization is at least 10 000 g/mol.

6. The polyester film according to claim 1, wherein the average molar mass of the polyethyleneimine is at least 25 000 g/mol.

7. The polyester film according to claim 1, wherein the coating solution is an aqueous coating solution and comprises 3-30% by weight of solids.

8. The polyester film according to claims 1, wherein the ratio by weight of the polyanion (before neutralization) to the polyethyleneimine is 90:10 to 50:50.

9. The polyester film according to claim 1, wherein the coating solution comprises, in addition to the polyanion and the polyethyleneimine, 5-20% by weight (based on the total solids content of the coating solution) of a crosslinking agent.

10. The polyester film according to claim 1, wherein said film has transparency above 90%, gloss at 20° above 120 and haze below 5%.

11. A process for the production of a polyester film according to claim 1, where the raw materials are melted in one extruder per layer and are extruded through a flat-film die onto a chilled take-off roll, the resultant prefilm is then reheated and sequentially or simultaneously oriented in longitudinal and transverse direction or in transverse and longitudinal direction and then is heat-set, cooled and wound up, characterized in that during the film-production process before longitudinal and/or transverse stretching an in-line coating is applied with application weight (wet) between 1.0 and 3.0 g/m$^2$, where the coating solution comprises at least one polyanion and at least one polyethyleneimine, where the polyanion comprises neutralized acid groups which are carboxylate, phosphate and/or sulfate groups, and where the dry thickness d of the coating after heat-setting is in the range 15 nm≤d<200 nm.

12. The polyester film according to claim 2, comprising particles, at a concentration below 0.5% by weight, based on the total weight of the film, and where the particles in a multilayer film are present in one or both outer layer(s).

13. The polyester film according to claims 1, wherein the ratio by weight of the polyanion (before neutralization) to the polyethyleneimine is 80:20 to 65:45.

* * * * *